United States Patent [19]

Shawl et al.

[11] Patent Number: 5,565,027

[45] Date of Patent: Oct. 15, 1996

[54] CEMENT COMPOSITION

[75] Inventors: Edward T. Shawl, Wallingford; Jeffrey A. Klang, Exton, both of Pa.

[73] Assignee: ARCO Chemical Technology, L.P., Greenville, Del.

[21] Appl. No.: 627,745

[22] Filed: Apr. 2, 1996

[51] Int. Cl.$^6$ .............................. C04B 24/24; C08F 8/28
[52] U.S. Cl. .................. 106/802; 106/724; 106/823; 524/4; 524/377; 524/378; 524/385; 524/386; 524/388; 525/56; 525/58; 525/61
[58] Field of Search .................... 106/724, 802, 106/823; 524/377, 378, 385, 386, 388, 4; 525/56, 58, 61

[56] References Cited

U.S. PATENT DOCUMENTS

| | | | |
|---|---|---|---|
| 4,814,014 | 3/1989 | Arfaei | 106/724 |
| 5,332,774 | 7/1994 | Klang et al. | 524/377 |
| 5,367,015 | 11/1994 | Gutweiler et al. | 524/557 |
| 5,380,597 | 1/1995 | Klang et al. | 428/441 |
| 5,393,343 | 2/1995 | Darwin et al. | 106/808 |

FOREIGN PATENT DOCUMENTS

| | | | |
|---|---|---|---|
| 2450681 | 4/1975 | Germany | 106/802 |
| 47-30608 | 8/1972 | Japan | 106/802 |

*Primary Examiner*—Anthony Green
*Attorney, Agent, or Firm*—William C. Long

[57] ABSTRACT

The invention relates to a cement composition containing a water reducing amount of the product formed by reaction of polyvinyl alcohol and an hydroxyaldehyde such as 4-hydroxybutanal.

4 Claims, No Drawings

CEMENT COMPOSITION

BACKGROUND OF THE INVENTION

1. Field of the Invention

The present invention relates to the use of polymeric additives comprised of the reaction product of polyvinyl alcohol and hydroxybutanal as water reducing additives for cement and to cement compositions containing these additives.

2. Description of the Prior Art

Additives for cement to increase the fluidity of cement paste, mortars and concretes have been known and in use for many years. These admixtures are also known as water reducers because they allow less water to be used in a mortar or concrete without loss of slump. The performance requirements for water reducing admixtures are specified in ASTM Method C494-92, "Standard Specifications for Chemical Admixtures for Concrete."

In ASTM C494-92, a water reducing admixture is defined as an admixture that reduces the quantity of mixing water required to produce concrete of a given consistency by at least 5%.

A high range water reducing admixture, also known as a superplasticizer, reduces the quantity of mixing water required to produce concrete of a given consistency by 12% or greater. Commercial water reducing admixtures include lignin sulfonates and naphthalene sulfonate-formaldehyde condensates. More recently, new classes of flow enhancers or water reducers have been described. U.S. Pat. No. 4,814,014 describes a cement composition containing a graft co-polymer containing a polyether backbone grafted to ethylenically unsaturated monomers such as acrylic acid. U.S. Pat. No. 5,393,343 describes a cement composition containing an imidized acrylic polymer made, for example, by reacting a polyacrylic acid of 2000 molecular weight with a polyethylene polypropylene oxide polymer of 2000 molecular weight terminated at one end by a primary amine group and at the other end by a methyl group.

The compositions of the prior art have not, however, been entirely satisfactory leaving much room for improvement.

BRIEF DESCRIPTION OF THE INVENTION

In accordance with the present invention, it has been found that the reaction product of polyvinyl alcohol and a hydroxy aldehyde such as hydroxybutanal is unexpectedly effective as a water reducing additive in cement.

DETAILED DESCRIPTION

Polyvinyl alcohol is, of course, a well known material of commerce which is usually made by hydrolysis or saponification of polyvinyl acetate. Materials having a wide range of the degree of polymerization are available.

Likewise, hydroxyaldehydes such as 4-hydroxybutanal and 3-hydroxy-2-methyl propionaldehyde are also readily available.

In accordance with the present invention, the water reducing polymeric cement additives are formed by the acid catalyzed reaction of polyvinyl alcohol with one or more hydroxyaldehydes. The polyvinyl alcohol starting material generally has an average degree of polymerization ranging from about 10,000 to 100,000, preferably 25,000 to 75,000.

The preferred hydroxyaldehydes are hydroxybutanals, the most preferred is 4-hydroxybutanal, usually in admixture with minor amounts of 3-hydroxy-2-methyl propionaldehyde. Mixtures comprised by weight of more than 60% 4-hydroxybutanal with less than 40% 3-hydroxy-2-methyl propionaldehyde up to 100% 4-hydroxybutanal are preferred.

The amount of hydroxybutanal reacted with polyvinyl alcohol can vary widely. Generally 5 to 45 wt % hydroxy butanal based on polyvinyl alcohol, preferably 10 to 40 wt% gives a polymeric reaction product which is useful according to the present invention.

The polyvinyl alcohol-hydroxybutanol reaction is carried out in the liquid phase at temperatures ranging from about 10° C.–110° C., preferably 50°–90° C., although other temperatures can be used. Pressures are sufficient to maintain the liquid phase, atmospheric pressure is preferred.

An acid catalyst is used. Preferred catalysts are mineral acids such as sulfuric acid and strong organic acids such as paratoluene sulfonic acid, methane sulfonic acid and the like. Mixtures of sulfuric acid and organic sulfonic acid are especially preferred.

Solvents which are inert are preferably used in the reaction. Examples are alcohols such as ethanol, propanol, t-butanol and the like, ethers such as methyl tertiary butyl ether, as well as other solvents; water can be used as a co-solvent.

Reaction times ranging from 30 minutes to 10 hours, preferably 1–5 hours, are usually adequate.

Commonly assigned U.S. Pat. No. 5,332,774, the disclosure of which is incorporated herein by reference, provides a comprehensive description of the preparation of polyvinyl acetals useful in practice of the invention.

The cements with which the water reducing agents of the invention may be used include ordinary, quick-hardening, and moderate-heat portland cements, alumina cement, blast-furnace slag cement, and flash cement, as well as other pozzolanic materials. Of these, portland cements of the ordinary and quick-hardening types are particularly desirable.

The quantity of additive used may vary with factors such as the polyvinyl alcohol degree of polymerization and the relative amount of hydroxybutanal reacted. The quantity of the water reducing agent to be used in accordance with the invention is usually in the range of 0.05–10%, preferably 0.15–4%, based on the weight of cement. If the quantity is less than 0.1% by weight, the compound usually will give only a slight water reducing effect. If the quantity exceeds 10 wt.%, costs of the additive are excessive. The quantity of water to be used for setting the cement is not critical; generally weight ratios of water to cement in the range 0.25:1 to 0.7:1, preferably 0.3:1 to 0.5:1 are satisfactory. Where necessary, an aggregate such as pebbles, gravels, sand, pumice, or fired pearlite may be employed in conventional amounts. The quantity of the water-reducing agent is usually 0.1–10%, based on the weight of the cement, or usually 0.02–3% on the basis of the total weight of the cement, water-reducing agent, water and aggregate combined.

Advantageously, the water reducing agents of this invention are used in combination with other known cement additives.

Among the optionally employable additional additives are: conventional hardening accelerators, e.g., metal chlorides such as calcium chloride and sodium chloride, metal sulfates, such as sodium sulfate, and organic amines such as triethanol-amine; ordinary hardening retarders, e.g. alcohols, sugars, starch and cellulose; reinforcing-steel corrosion inhibitors such as sodium nitrate and calcium nitrite; other water reducing agents such as ligninsulfonic acid salt, as well as salts of oxycarboxylic acid and formalin condensate of napthalenesulfonic acid; air extrainers; other super plasticizers; ethylene oxide/propylene oxide carboxylates, strength enhancers, anti-foaming agents and the like. The quantity of such an optional ingredient or ingredients is usually 0.05–6% by weight of the cement.

The manner of adding the water reducing agent of the invention to the cement may be the same as with ordinary cement admixtures. For example, the water reducing agent can be admixed with a suitable proportion of water and then this composition is mixed with cement and aggregate. As an alternative, a suitable amount of the water reducing agent may be added when cement, aggregate and water are mixed. The additive can be mixed in at the cement mill during the grinding of clinker to form cement powder. It can also be mixed with the cement powder during its blending with other dry materials to form a blended cement or pozzolanic cement and the like.

The concrete and the like incorporating the water-reducing agent according to the invention may be applied in conventional ways. For example, it may be trowelled, filled in forms, applied by spraying, or injected by means of a caulking gun. Hardening or curing of the concrete and the like may be by any of the air drying, wet air, water and assisted (steam, autoclave, etc.) curing techniques. If desired, two or more such techniques may be combined. The respective curing conditions may be the same as in the past.

EXAMPLES

The polymeric water-reducing additive was prepared by reacting hydroxybutanal with poly (vinyl alcohol) as follows:

A total of 300 g poly (vinyl alcohol) with $M_n$=50,000 at 99+ % hydrolyzed, 7.2 g sulfuric acid, 16.8 g p-toluenesulfonic acid and 5.0 L ethyl alcohol were charged to a 12 liter round bottom flask equipped with a mechanical stirrer. The mixture was heated to 70° C. and 1.16 liters of an aqueous solution containing 12–15 wt % 4-hydroxybutanal and 3-hydroxy-2-methylpropionaldehyde in a ratio of approximately 7:1 was added over 2.5 hours. Heating was continued another 2 hours. After cooling an equal volume of saturated aqueous sodium bicarbonate solution was added to precipitate the product. The white granular product, identified as PVHB-848802, was collected by filtration, washed with distilled water and then with acetone and then dried under vacuum at 50° C.

This material was then used in a mortar mix to determine its effect on the flow properties of the mortar as measured using a half-size slump cone. The mortar mix was made with a sand to cement weight ratio of 2.25 and a water to cement weight ratio of 0.40 using 1200 g Type 1 Portland cement and 2700 g C778 ASTM Ottawa graded sand. The admixture was added with the water. Results are shown in the Table. Water reduction of about 8% was achieved with the poly (vinyl alcohol)-hydroxybutanal polymeric reaction product whereas no water reduction was obtained with the poly (vinyl alcohol) itself or a poly (vinyl alcohol)-butanal copolymer.

TABLE

| Additive | w/c* | wt % of additive on cement | Slump, mm |
| --- | --- | --- | --- |
| None | 0.48 | — | 87 |
| None | 0.43 | — | 36 |
| None | 0.40 | — | 23 |
| PVHB-858802 | 0.40 | 1.0 | 44 |
| PVA-butanal copolymer (comparative) | 0.40 | 1.0 | 17 |
| Poly (vinyl alcohol), $M_n$ = 50,000 (Comparative) | 0.40 | 1.0 | 19 |

*water/cement weight ratio

From the above, it can be seen that addition of the polymeric material in accordance with the invention resulted in significantly improved flow properties of the mortar mixture.

The data demonstrate that, surprisingly, neither polyvinyl alcohol nor a polyvinyl alcohol/butanal reaction product similarly prepared were effective as water reducing agents.

We claim:

1. A cement composition comprising of cement and a water reducing amount of the polymeric product formed by reaction of polyvinyl alcohol and a hydroxyaldehyde.

2. The composition of claim 1 wherein the hydroxyaldehyde is 9 hydroxybutanal.

3. The composition of claim 1 wherein the hydroxyaldehyde comprises 4-hydroxybutanal.

4. A concrete composition comprising of the composition of claim 1 together with water and aggregate.

* * * * *

UNITED STATES PATENT AND TRADEMARK OFFICE
CERTIFICATE OF CORRECTION

PATENT NO. : 5,565,027
DATED : October 15, 1996
INVENTOR(S) : Edward T. Shawl and Jeffrey A. Klang It is certified that error appears in the above-indentified patent and that said Letters Patent is hereby corrected as shown below:

Column 4, line 43, delete "9 hydroxybutanal" and insert --an hydroxybutanal--.

Signed and Sealed this

Fifteenth Day of July, 1997

Attest:

BRUCE LEHMAN

Attesting Officer    Commissioner of Patents and Trademarks